United States Patent
Heilmann

(10) Patent No.: US 12,413,400 B2
(45) Date of Patent: Sep. 9, 2025

(54) QUANTUM KEY DISTRIBUTION

(71) Applicant: Quantum Optics Jena GmbH, Jena (DE)

(72) Inventor: René Heilmann, Jena (DE)

(73) Assignee: Quantum Optics Jena GmbH, Jena (DE)

( * ) Notice: Subject to any disclaimer, the term of this patent is extended or adjusted under 35 U.S.C. 154(b) by 91 days.

(21) Appl. No.: 18/436,176

(22) Filed: Feb. 8, 2024

(65) Prior Publication Data
US 2025/0007698 A1    Jan. 2, 2025

(30) Foreign Application Priority Data
Feb. 21, 2023   (DE) ............. 10 2023 104 245.9

(51) Int. Cl.
H04L 9/08    (2006.01)

(52) U.S. Cl.
CPC .................. H04L 9/0852 (2013.01)

(58) Field of Classification Search
CPC .................................... H04L 9/0852
See application file for complete search history.

(56) References Cited

U.S. PATENT DOCUMENTS

| | | | | |
|---|---|---|---|---|
| 8,923,517 B2* | 12/2014 | Arahira | ............. | H04L 9/0852 380/278 |
| 9,451,453 B2* | 9/2016 | Brodsky | ............. | H04L 9/0833 |
| 10,341,097 B2* | 7/2019 | Takahashi | ............. | H04L 9/0858 |
| 10,361,848 B2* | 7/2019 | Gray | ............. | H04L 9/0855 |
| 10,862,678 B2* | 12/2020 | Kaliteevskiy | ............. | H04B 10/70 |
| 11,411,723 B2* | 8/2022 | Legré | ............. | H04L 9/0858 |
| 12,010,223 B2* | 6/2024 | Djordjevic | ............. | H03M 13/116 |
| 2009/0190759 A1* | 7/2009 | Peev | ............. | H04L 9/0858 380/256 |

(Continued)

FOREIGN PATENT DOCUMENTS

| | | |
|---|---|---|
| EP | 1 730 879 B1 | 1/2012 |
| EP | 3 771 137 A1 | 1/2021 |

OTHER PUBLICATIONS

German Examination Report.

(Continued)

*Primary Examiner* — Viral S Lakhia
(74) *Attorney, Agent, or Firm* — Hoffmann & Baron, LLP

(57) ABSTRACT

A method for key generation with quantum key distribution including:
  i) generation of entangled photon pairs;
  ii) transmission of the photons to a first and second receiver;
  iii) measurement of photons at the first receiver to generate a first raw key and first receiver data and measuring photons at the second receiver to generate a second raw key and second receiver data;
  iv) generation of a first sifted key at the first receiver and at the second receiver by sifting and then generation of a common key.
In step iv), the first receiver data are first transmitted from the first receiver to the second receiver, and subsequently in step iv) the second receiver performs a pre-sifting to reduce the second receiver data, based on the first receiver data and one or more pre-sifting parameters, and subsequently in step iv) the pre-sifted second receiver data are transmitted to the first receiver.

15 Claims, 2 Drawing Sheets

(56) References Cited

U.S. PATENT DOCUMENTS

2022/0014362 A1* 1/2022 Djordjevic ............. H04B 10/70

OTHER PUBLICATIONS

Erven C et al: "Entangled Quantum Key Distribution Over Two Free-Space Optical Links", arxiv.org, Cornell University Library, 201 Olin Library Cornell University Ithaca, NY 14853, Jul. 15, 2008 (Jul. 15, 2008), XP080426793.
European Search Report dated Jul. 3, 2024.

* cited by examiner

QUANTUM KEY DISTRIBUTION

BACKGROUND OF THE INVENTION

The invention relates to a method for key generation by means of quantum key distribution and to a system for key generation by means of quantum key distribution.

The generation of a key by quantum key distribution (QKD), for example with polarization-entangled photon pairs, is far superior to classical key generation, as the security of this type of generation is not based on a mathematical calculation or an algorithm, but on the physical laws of nature of the system, i.e. the entanglement of the photon pairs.

For quantum key distribution (QKD), the entangled photon pairs are generated in a source and one photon of each photon pair is transmitted to a first receiver and to a second receiver in one quantum channel each. In both receivers, the photons are measured to generate a raw key.

It is essential that only measurement results of the entangled photon pairs are used for a common key, but not only photons of the entangled photon pairs are measured by both receivers, but measurement results are also obtained by scattered light or loss of a photon of a photon pair or additional measurement results are generated by electronic noise. Measurement results of non-entangled photon pairs are discarded by the sifting step during quantum key distribution in order to generate a sifted key for both receivers.

For sifting purposes, information is exchanged between the two receivers after the photons have been measured. This information is, for example, the time stamps of the measured photons, i.e. the time stamps of the measurement results to determine the photon pairs. In known methods, the first receiver transmits for sifting all unfiltered information to the second receiver and at the same time the second receiver transmits all unfiltered information to the first receiver. Each receiver then carries out the sifting process on their own raw key.

This information is usually exchanged via a classical channel. The information to be transmitted for sifting generates by far the largest part of the data load in the classical channel between the two receivers. This means that to generate a key using quantum key distribution, a classical channel with a very large bandwidth must be made available, or the rate at which a key is generated using quantum key distribution is limited by the maximum transmission rate of the classical channel.

SUMMARY OF THE INVENTION

It is the object of the present invention to provide an improved method and an improved system for key generation in quantum key distribution (QKD).

According to the invention, this object is achieved by a method for key generation with quantum key distribution.

According to the invention, a method for key generation with quantum key distribution is provided, between a first receiver and a second receiver of photons, the method comprising the following steps:

i) generation of entangled photon pairs, each with a signal photon and an idler photon in a source;
ii) transmission of the signal photons in a first quantum channel to the first receiver and transmission of the idler photons in a second quantum channel to the second receiver;
iii) measurement of photons at the first receiver to generate a first raw key and first receiver data and measuring of photons at the second receiver to generate a second raw key and second receiver data;
iv) generation of a first sifted key at the first receiver and generation of a second sifted key at the second receiver by sifting the first and second raw keys and then generation of a common key at the first receiver and the second receiver.

It is essential that in step iv) the first receiver data are first transmitted from the first receiver to the second receiver, and
that subsequently, in step iv), at the second receiver a pre-sifting is performed to reduce the second receiver data, based on the first receiver data and one or more pre-sifting parameters, and
that subsequently in step iv) the pre-sifted second receiver data are transmitted to the first receiver, and
that in step iv) the generation of the first sifted key and the second sifted key are performed on the basis of the first receiver data and the pre-sifted second receiver data and one or more sifting parameters.

The object is further achieved by a system for key generation between a first receiver and a second receiver with quantum key distribution.

According to the invention, a system for key generation with quantum key distribution is provided, the system comprising a source, a first receiver and a second receiver, and
wherein the source comprises a non-linear element for generating entangled photon pairs each comprising a signal photon and an idler photon, and
wherein the source is connected via a first quantum channel to the first receiver for transmission of the signal photons and the source is connected via a second quantum channel to the second receiver for transmission of the idler photons, and
that the first receiver has a first measurement module for measuring photons at the first receiver and first electronics for generating the first raw key and first receiver data from the measurement results of the first measurement module and for processing and storing them, and
that the second receiver has a second measurement module for measuring the photons at the second receiver and second electronics for generating a second raw key and second receiver data from the measurement results of the second measurement module and for processing and storing them, and
that the first receiver and the second receiver are connected to each other via a classical channel.

It is essential here that the transmission rate of the photons in the second quantum channel from the source to the second receiver is greater than the transmission rate of the photons in the first quantum channel from the source to the first receiver, and
that the second electronics is configured to pre-sift and reduce the second receiver data on the basis of the first receiver data and one or more pre-sifting parameters, and
that the first electronics and the second electronics are formed for sifting the first raw key and the second raw key on the basis of the pre-sifted second receiver data and the first receiver data.

The advantage of the method according to the invention and the system according to the invention lies in the reduction of the data to be transmitted for the sifting step for quantum key distribution. For this, in accordance with the invention, the first receiver data are first transmitted from the first receiver to the second receiver and the second receiver data are pre-sifted on the basis of this data. Pre-sifting means here a sifting only at the second receiver and its second receiver data using the pre-sifting parameters. This pre-sifting greatly reduces the data to be transmitted from the second receiver to the first receiver and thus greatly reduces the data rate to be transmitted in the classical channel for generating the common key.

Sifting can be understood to mean that the bits based on entangled photon pairs are determined in the respective raw key and all other bits are discarded. All bits of the respective raw key of entangled photon pairs in which different bases were used to measure the entangled photon pair can also be discarded during sifting.

It may be provided that in step iv) a coincidence window of the photon pairs and/or the measurement basis of the photon pairs is used as one or more pre-sifting parameters.

It may be provided, preferably in step iv), that the coincidence window of the pre-sifting parameter is equal to or greater than the coincidence window of the sifting parameters. It may be provided, preferably in step iv), that the coincidence window of the pre-sifting parameter corresponds to at least twice, preferably at least three times, the coincidence window of the sifting parameters. It is essential here that there is no restriction when generating the key as long as the pre-sifting parameters are not more restrictive than the sifting parameters for the sifting.

It may be provided that in step iii) both photons of the entangled photon pairs and non-entangled photons are measured at the first and/or second receiver. It may be provided that in step iii) the first and/or second receiver data are generated by photons of the entangled photon pairs as well as non-entangled photons at the first and/or second receiver. Here, the non-entangled photons can be generated by the loss of a photon from an entangled photon pair or by additional scattered light or pump light. It may be provided that in step iii) additional data are generated in the first receiver data and/or second receiver data by electronic noise.

It may be provided that the measurement in step iii) is performed at the first receiver in a first measurement module for measuring photons at the first receiver and a first electronics for generating the first raw key and first receiver data from the measurement results, and the processing and storage in step vi) is performed at the first receiver, and that the measurement in step iii) is performed at the second receiver in a second measurement module for measuring photons at the second receiver and a second electronics for generating the second raw key and second receiver data from the measurement results, and the processing and storage in step vi) is performed at the second receiver. The advantage is that both receivers in the two electronics can generate the respective raw key and the respective receiver data separately from each other.

It may be provided that the first receiver data contain the time stamps of all measurement results at the first receiver and/or the measurement basis used in each case. It may be provided that the measurement results are generated by all measured photons at the first receiver and/or by electronic noise at the first receiver. It may be provided that in a first step, preferably for pre-sifting, the time stamps or the measurement bases are transmitted first and in a further step, preferably for sifting, the measurement bases or the time stamps are transmitted.

It may be provided that the second receiver data contain the time stamps of all measurement results at the second receiver and/or the measurement basis used in each case. It may be provided that the measurement results are generated by all measured photons at the second receiver and/or by electronic noise at the second receiver.

It may be provided that for determining the entangled photon pairs in the first and second receiver data, the time of the measurement of the signal photons and the idler photons, preferably the time stamps, are exchanged, in order to determine coincidences. Coincidence means the simultaneous measurement of the signal photon and the idler photon of a photon pair at the two receivers (simultaneous means a measurement of the photons that correlate with the same emission time in the source).

It may be provided that the first raw key consists of all measurement results at the first receiver, preferably together with the respective measurement bases used. It may be provided that the second raw key consists of all measurement results at the second receiver, preferably together with the respective measurement bases used. It may be provided that each measurement result of the first receiver represents a bit of the first raw key and each measurement result of the second receiver represents a bit of the second raw key.

It may be provided that the first sifted key and the second sifted key consist only of measurement results of entangled photon pairs, which were measured for each entangled photon pair in the same measurement basis. It may be provided that each photon of an entangled photon pair represents a bit of the first sifted key and each corresponding photon of the entangled photon pairs represents a bit of the second sifted key.

It may be provided that at least 8 bits, preferably at least 24 bits, most preferably at least 64 bits are used to describe each measurement result, preferably each time stamp and/or the measurement basis.

It may be provided that a reduction of the second receiver data by at least 50%, preferably at least 70%, most preferably at least 90% is achieved by the pre-sifting, preferably in step iv). It may be provided that the pre-sifting, preferably in step iv), results in a reduction of the transmission rate of the pre-sifted second receiver data to the second receiver data in the classical channel of at least 50%, preferably at least 70%, most preferably at least 90%.

It may be provided that, preferably in step iii), the count rate of the measurement results, preferably of the measured photons, is greater at the second receiver than at the first receiver. Count rate means the number of photons measured, preferably in step iii), most preferably per second. This means that the data to be transmitted can be reduced particularly efficient in the classical channel, i.e. the pre-sifting is applied to the receiver that has a higher count rate.

In step ii), it may be provided that the transmission rate in the second quantum channel from the source to the second receiver is greater than the transmission rate in the first quantum channel from the source to the first receiver. The transmission rate results from the number of photons before the quantum channel minus the loss of photons in the quantum channel up to the respective receiver.

It may be provided that the transmission rate in the second quantum channel is greater, in that the second quantum channel has lower photon losses, preferably through appropriate material selection, and/or that a wavelength of the idler photons is used for a better transmission rate.

It may be provided that the second receiver is located at the source or in the vicinity of the source.

It may be provided that the second quantum channel to the second receiver is shorter than the first quantum channel to the first receiver.

It may be provided that the measurement of the signal photons and the idler photons in step iii) is performed in one of at least two mutually unbiased measurement bases.

It may be provided that the transmission of the first and/or second receiver data, preferably in step iv), takes place in a classical channel. It may be provided that the classical channel is formed as a wired channel or network and/or wireless channel or network. It may be provided that the transmission in step iv) takes place via the classical channel through the Internet or a radio connection or a data bus system. A classical channel is also often referred to as a public channel. A classical channel can be understood as a deterministic channel via which defined ones and zeros are exchanged. It may be provided that the transmission of the first and/or second receiver data, preferably in step iv), takes place encrypted or not encrypted in the classical channel.

It may be provided that the first and/or the second quantum channel is a free-space quantum channel and/or a fiber quantum channel.

It may be provided that the selection of the measurement bases in step iii) is random, preferably random at the first receiver and independently random at the second receiver.

It may be provided that after the sifting in step iv), an error detection is carried out at the first receiver in the first electronics and at the second receiver in the second electronics. It may be provided that the first electronics and the second electronics are formed to perform the error detection and preferably communicate with each other via the classical channel for error detection.

It may be provided that the first electronics and/or the second electronics are formed as hardware-based electronics, for example based on ASICs or FPGAs, and/or are formed as software-based electronics, for example comprising a microprocessor or a signal processor and an executable software program.

It may be provided that the multiple entangled photon pairs are generated one after the other in step i). It may be provided that the multiple entangled photon pairs are transmitted one after the other in step ii). It may be provided that the multiple entangled photon pairs are measured one after the other in step iii). It may be provided that further photon pairs are generated during transmission and/or measurement.

It may be provided that the entangled photon pairs are entangled in time, and/or polarization, and/or orbital angular momentum, and/or spin angular momentum, and/or wavelength.

It may be provided that the method and the system are formed for data transmission with quantum key distribution.

It may be provided that the method for data transmission with quantum key distribution comprises the following steps in addition to the steps described above:

v) encrypting the data to be transmitted at the first or second receiver using the common key;
vi) transmission of the encrypted data from the first or second receiver to the second or first receiver;
vii) decrypting the encrypted data at the second or first receiver using the common key.

It may be provided that in the system for data transmission with quantum key distribution, the first electronics and/or the second electronics are formed for encryption and/or decryption of the data to be transmitted.

It may be provided that the system is formed to carry out the method according to one of the embodiments described above.

It may be provided that the first electronics and the second electronics are formed to carry out steps iii) to iv) of the method, preferably iii) to vii).

It may be provided that the common key is stored at both receivers before the data are encrypted, preferably in the first electronics and the second electronics.

It may be provided that the encryption of the data is carried out in the first electronics of the first receiver and/or that the decryption of the data is carried out in the second electronics of the second receiver. It may be provided that the encryption of the data is carried out in the second electronics of the second receiver and/or that the decryption of the data is carried out in the first electronics of the first receiver.

As a non-exclusive example, the pre-sifting and thus obtained reduction of the data by a method according to the invention with quantum key distribution with a BBM92 protocol is given below.

For this example, it is assumed that the source of the entangled photons is located at or near the first receiver.

The first receiver has a photon count rate (photon detection rate) of $R_1$ and the second receiver of $R_2$. These result from the photon rate $R_0$ directly after the source and the respective relative transmission rates $T_1$ and $T_2$ of the quantum links to the receivers (relative losses=$1-T_x$).

$$R_1 = R_0 \cdot T_1$$
$$R_2 = R_0 \cdot T_2$$

It is assumed that the source has a photon pair yield of $H_0$, which relates the number of entangled photon pairs generated $P_0$ to the photon rate $R_0$ directly after the source.

$$P_0 = R_0 \cdot H_0$$

The photon pair rate ($P_1$, $P_2$) between the first receiver and the second receiver is then calculated taking into account all losses:

$$P_1 = P_2 = P_{1,2} = P_0 \cdot T_1 \cdot T_2 = R_0 \cdot H_0 \cdot T_1 \cdot T_2$$

The number of events $E_{total\ non\ inv}$ to be transmitted is calculated without the method and system according to the invention by $$E_{total\ non\ inv} = R_1 + R_2 = R_0 \cdot (T_1 + T_2)$$

In the following, it is assumed that the second receiver carries out the pre-sifting. The smallest possible number of events $E_{total\ inv}$ to be transmitted with the method according to the invention and the system according to the invention with a sifting parameter as a pre-sifting parameter is calculated from $$E_{total\ inv} = R_1 + P_2 = R_0 \cdot T_1 \cdot (1 + H_0 \cdot T_2) \gtrsim R_0 \cdot T_1 = R_1$$

For known sources, $H_0 \cdot T_2 \ll 1$ applies.

This restriction reduces the number of events to be transmitted from $R_1+R_2$ to almost ($\gtrsim$) $R_1$. The larger $R_2$ is in relation to $R_1$, the greater the reduction. Therefore, for the best possible reduction in the number of events to be transmitted, the pre-sifting should be performed on the side with the higher count rates, i.e. the receiver with the lower count rate transmits the data first.

The calculations described above can be used to calculate the reduction in data transmission for such a protocol. As an example, a source with $R_0=10$ Mio single photons per second per arm and a photon pair yield of $H_0=10\%$ is assumed, resulting in 1 million photon pairs $P_0$ second. This corresponds to average values of current entangled photon sources.

Furthermore, as already mentioned, it is assumed that the source is located in the vicinity of the second receiver and therefore there is little or no loss during transmission $T_2=1$. From this follows $R_2=10$ Mio Counts/s. For transmission to the first receiver, a loss of 20 dB is assumed due to the distance $T_1=0.01$, which is a value that is still acceptable for potential users due to the distance between the two receivers. This results in $R_1=100$ k Counts/s. The measured pair rate $P_{1,2}=100$ k Paare/s can be calculated from these values.

64 bits are used to describe each photon detection, which contain the time stamp and the respective measurement basis.

For a method not according to the invention and a corresponding system, this results in a necessary transmission rate in the classical channel of:

$$(100\ k + 10\ Mio)\ 64\ \text{Bit/s} = 646\ Mbit/s$$

For a method according to the invention and a corresponding system with the exemplary values described above, this results in a reduced transmission rate in the classical channel of:

$$(100\ k + 10\ k)\ 64\ \text{Bit/s} = 7.04\ Mbit/s$$

This corresponds to a reduction of the data to be transmitted by the method according to the invention and the corresponding system of approx. 98.9%.

BRIEF DESCRIPTION OF THE DRAWINGS

Further embodiments of the invention are shown in the figures and described below. The figures show an example of a possible embodiment of the invention. This embodiment serves to explain a possible implementation of the invention and should not be understood as limiting. They show.

DETAILED DESCRIPTION

Figure 1:
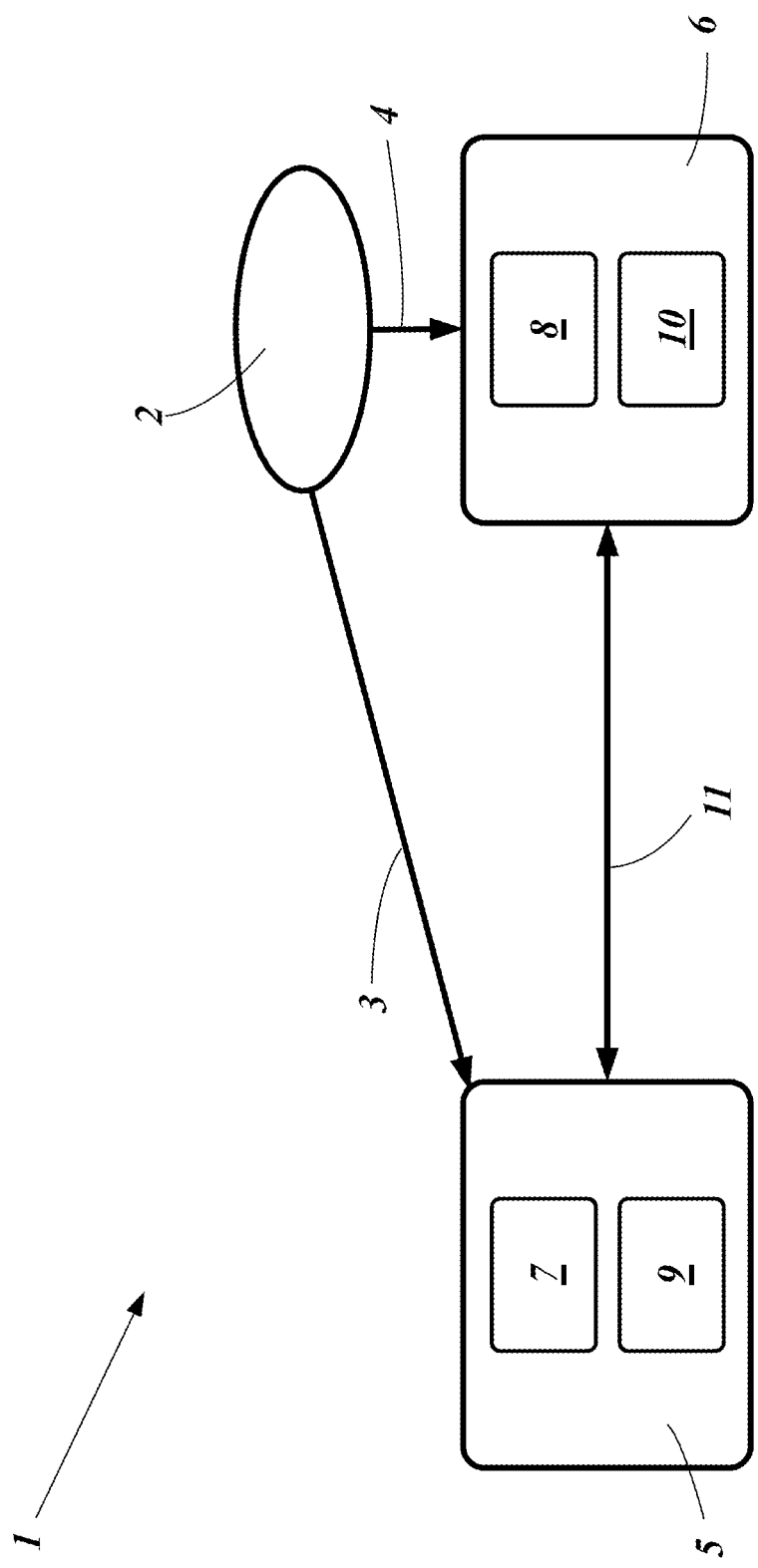
FIG. 1 is a schematic representation of the system according to the invention for key generation with quantum key distribution.

FIG. 1 shows a system 1 according to the invention for key generation with quantum key distribution, which comprises a source 2, a first receiver 5 and a second receiver 6.

The source 2 generates entangled photon pairs, each with a signal photon and an idler photon. To generate entangled photon pairs, a non-linear element can be used, which is for example pumped by a laser. The source 2 is connected to the first receiver 5 via a first quantum channel 3 and to the second receiver 6 via a second quantum channel 4. The first and second quantum channel 3, 4 can be formed as optical fiber, for example. The source 2 is connected to the first quantum channel 3 and the second quantum channel 4 in such a way that the signal photons of the entangled photon pairs are transmitted from the source 2 via the first quantum channel 3 to the first receiver 5, and that the Idler photons of the entangled photon pairs are transmitted from the source 2 via the second quantum channel 4 to the second receiver 6.

The first receiver 5 has a first measuring module 7 and first electronics 9. In the first measurement module 7 of the first receiver 5, the incoming photons are measured using a random measurement basis. The result of this measurement is compiled in the first electronics 9 to form a first raw key, and the time stamp of each measurement and the measurement basis used are stored in the first electronics 9 as the first receiver data.

The second receiver 6 has a second measuring module 8 and second electronics 10. In the second measurement module 8 of the second receiver 6, the incoming photons are measured using a random measurement basis. The result of this measurement is compiled in the second electronics 10 to form a second raw key, and the time stamp of each measurement and the measurement basis used are stored in the second electronics 10 as the second receiver data.

It is essential that not only photons of the entangled photon pairs are measured with both receivers, but that measurement results are also obtained by scattered light or loss of a photon of a photon pair or additional measurement results are generated by electronic noise. However, only measurement results from entangled photon pairs are used for a common key generated with quantum key distribution. Measurement results of non-entangled photon pairs are discarded by the sifting step in the course of the quantum key distribution in order to generate a sifted key at both receivers and to generate the common key from this, for example by error detection, error correction or increasing of privacy.

For sifting, after measuring the photons, the first receiver data and the second receiver data are exchanged via the classical channel 11 in accordance with the method according to the invention and the sifting is carried out accordingly in system 1.

Figure 2:
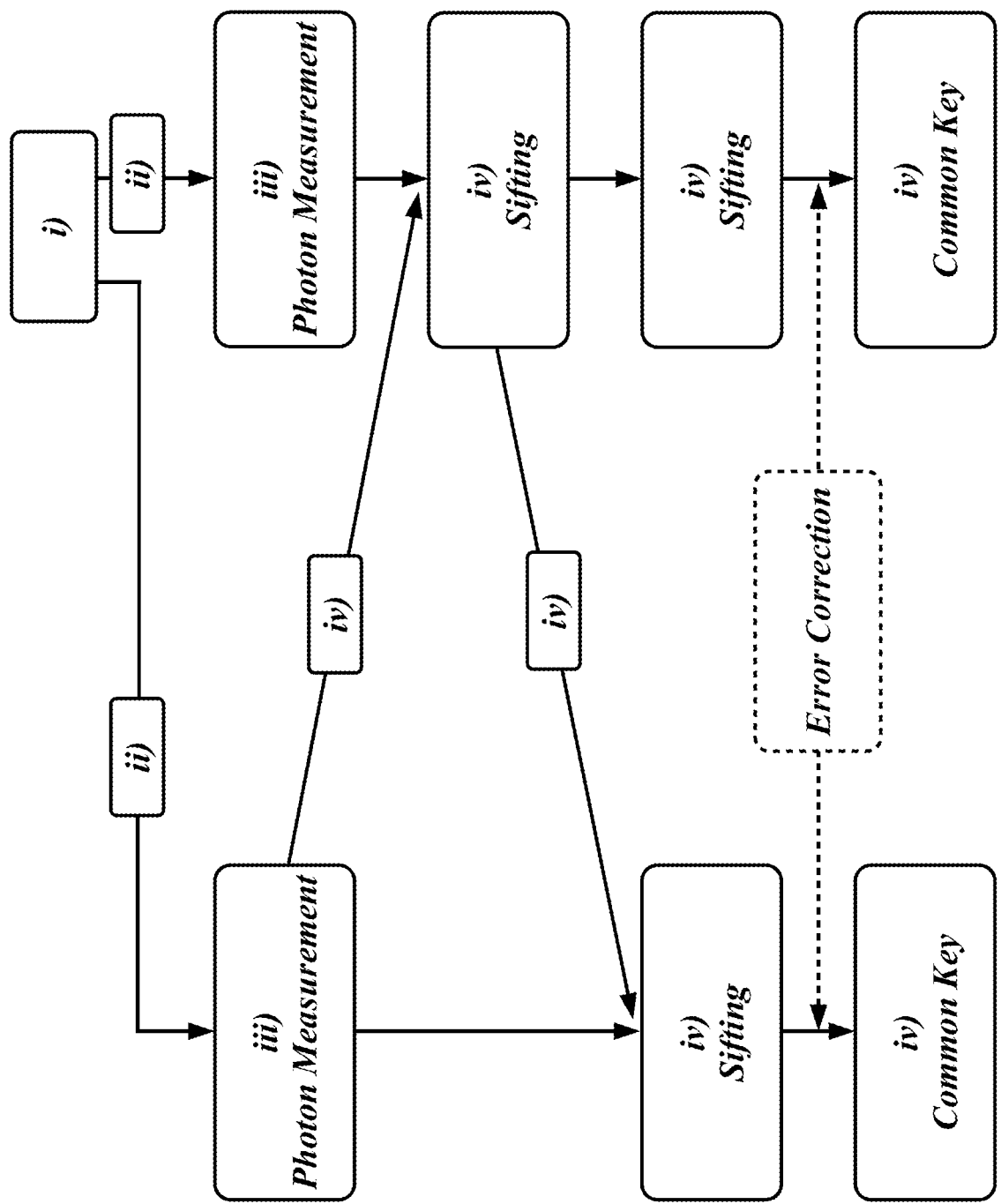
FIG. 2 is a schematic representation of the steps of the method according to the invention for key generation with quantum key distribution.

FIG. 2 shows the steps of the method according to the invention, which is carried out in the system 1 of FIG. 1 according to the invention.

First, entangled photon pairs are generated in the source 1 in step i), whereby in step ii) the signal photons in the first quantum channel 3 are transmitted to the first receiver 5 and the idler photons in the second quantum channel 4 are transmitted to the second receiver 6. The entangled photon pairs are generally generated one after the other in terms of time and are also transmitted to the receivers one after the other in terms of time and measured one after the other at the first receiver 5 and at the second receiver 6.

At the first receiver 5, photons are measured in step iii) in the first measurement module 7 using a random measurement basis in each case, whereby subsequently in step iii) in the first electronics 9 the result of the measurements in the first electronics 9 is combined to form the first raw key and the time stamp of each measurement and the measurement basis used are stored in the first electronics 9 as first receiver data.

At the second receiver 6, photons are measured in step iii) in the second measurement module 8 using a random measurement basis in each case, whereby subsequently in step iii) in the second electronics 10 the result of the measurements is combined in the second electronics 10 to form the second raw key and the time stamp of each measurement and the measurement basis used are stored in the second electronics 10 as second receiver data.

For sifting the first raw key and the second raw key in step iv), a pre-sifting is first carried out. For pre-sifting, the first receiver data of the first receiver 5 are transmitted to the second receiver 6 via the classical channel 11. Here, for example, only the time stamps, or only the measurement bases used, or both can be transmitted.

Based on the first receiver data, the second receiver 6 performs a so-called pre-sifting with pre-sifting parameters, for example by comparing the time stamps of the first receiver data and the second receiver data in order to discard measurement results or bits in the second raw key that were not generated by entangled photons. For example, a larger time slot can be used as a pre-sifting parameter to determine the entangled photon pairs than is subsequently used for sifting. However, it is also possible to use the sifting parameters as pre-sifting parameters at the second receiver 6. The second receiver data are thus pre-sifted by the pre-sifted according to the first receiver data and one or more pre-sifting parameters. The first raw key can also be pre-sifted, i.e. corresponding bits can be discarded.

Pre-sifting reduces the size of the second receiver data to the pre-sifted second receiver data. This pre-sifted second receiver data are then transmitted to the first receiver 5 in step iv) in the classical channel 11. It is essential here that the pre-sifted second receiver data are then used for sifting the first receiver data at the first receiver 5. The sifting is also carried out in step iv) at the second receiver 6 if the pre-sifting parameters have not yet corresponded to the sifting parameters.

At the end of the sifting, the first receiver 5 and the second receiver 6 share a correlated key of the same length, i.e. the first sifted key and the second sifted key. The common key can be generated from this, whereby further steps, such as error detection, error correction or increasing of privacy, can optionally be carried out, as indicated schematically in FIG. 2 by the dashed error correction step.

LIST OF REFERENCE SIGNS

1 System
2 Source
3 First quantum channel
4 Second quantum channel
5 First receiver
6 Second receiver
7 First measuring module
8 Second measuring module
9 First electronics
10 Second electronics
11 Classical channel

The invention claimed is:

1. A method for key generation with quantum key distribution, between a first receiver and a second receiver of photons, the method comprising the following steps:
  i) generation of entangled photon pairs each with a signal photon and an idler photon in a source;
  ii) transmission of the signal photons in a first quantum channel to the first receiver and transmission of the idler photons in a second quantum channel to the second receiver;
  iii) measurement of photons at the first receiver to generate a first raw key and first receiver data and measuring photons at the second receiver to generate a second raw key and second receiver data; and
  iv) generation of a first sifted key at the first receiver and generation of a second sifted key at the second receiver by sifting the first and second raw keys and then generation of a common key at the first receiver and the second receiver;
  v) encrypting the data to be transmitted at the first or second receiver using the common key; and
  vi) transmission of the encrypted data from the first or second receiver to the second or first receiver,
  wherein, in step iv), the first receiver data are first transmitted from the first receiver to the second receiver, and
  wherein, subsequently in step iv), at the second receiver a pre-sifting is performed to reduce the second receiver data, based on the first receiver data and one or more pre-sifting parameters, and
  wherein, subsequently in step iv), the pre-sifted second receiver data are transmitted to the first receiver, and
  wherein, in step iv), the generation of the first sifted key and the second sifted key are performed on the basis of the first receiver data and the pre-sifted second receiver data and one or more sifting parameters.

2. The method according to claim 1, wherein, in step iv), a coincidence window of the photon pairs and/or the measurement basis of the photon pairs is used as one or more pre-sifting parameters.

3. The method according to claim 1, wherein, in step iii), photons of the entangled photon pairs as well as non-entangled photons are measured at the first and/or at the second receiver.

4. The method according to claim 1, wherein the first receiver data comprise the time stamps of all measurement results at the first receiver, and/or the respective measurement basis used, and/or
  wherein the second receiver data have the time stamps of all measurement results at the second receiver and/or the respective measurement basis used.

5. The method according to claim 1, wherein, to determine the entangled photon pairs in the first and second receiver data, the time of measurement of the signal photons and the idler photons are exchanged.

6. The method according to claim 1, wherein at least 8 bits are used to describe each measurement result.

7. The method according to claim 1, wherein the pre-sifting in step iv) results in a reduction of the second receiver data by at least 50%.

8. The method according to claim 1, wherein, in step iii), the count rate of the measurement results is greater at the second receiver than at the first receiver.

9. The method according to claim 1, wherein the transmission of the first and/or second receiver data, in step vi), takes place in a classical channel.

10. The method according to claim 1, wherein the plurality of entangled photon pairs are generated one after the other in step i), and/or the plurality of entangled photon pairs are transmitted one after the other in step ii), and/or the plurality of entangled photon pairs are measured one after the other in step iii).

11. The method according to claim 1, wherein the common key is stored at both receivers before the data are encrypted.

12. The method according to claim 1, wherein, in step iii), the first and/or second receiver data are generated by photons of the entangled photon pairs as well as non-entangled photons at the first and/or second receiver.

13. The method according to claim 1, further comprising:
   v) encrypting the data to be transmitted at the first or second receiver using the common key;
   vi) transmission of the encrypted data from the first or second receiver to the second or first receiver; and
   vii) decrypting the encrypted data at the second or first receiver using the common key.

14. A system for key generation with quantum key distribution, the system comprising a source, a first receiver and a second receiver, and
   wherein the source comprises a non-linear element for generating entangled photon pairs each comprising a signal photon and an idler photon, and
   wherein the source is connected via a first quantum channel to the first receiver for transmission of the signal photons and the source is connected via a second quantum channel to the second receiver for transmission of the idler photons, and
   wherein the first receiver has a first measurement module for measuring photons at the first receiver and first electronics for generating the first raw key and first receiver data from the measurement results of the first measurement module and for processing and storing them, and
   wherein the second receiver has a second measuring module for measuring the photons at the second receiver and second electronics for generating a second raw key and second receiver data from the measurement results of the second measuring module and for processing and storing them, and
   wherein the first receiver and the second receiver are connected to each other via a classical channel, and
   wherein the transmission rate of the photons in the second quantum channel from the source to the second receiver is greater than the transmission rate of the photons in the first quantum channel from the source to the first receiver, and
   wherein the second electronics is formed to pre-sift and reduce the second receiver data on the basis of the first receiver data and one or more pre-sifting parameters, and
   wherein the first electronics and the second electronics are formed for sifting the first raw key and the second raw key on the basis of the pre-sifted second receiver data and the first receiver data, and
   wherein the first electronics and/or the second electronics are formed for generating a common key at the first receiver and the second receiver, and
   wherein the first electronics and/or the second electronics are formed for encrypting the data to be transmitted at the first or second receiver using the common key, and
   wherein the first electronics and/or the second electronics are formed for transmitting the encrypted data from the first or second receiver to the second or first receiver.

15. The system according to claim 14, wherein the system is formed for data transmission with quantum key distribution, in that the first electronics and/or the second electronics are formed for encrypting and/or decrypting the data to be transmitted.

* * * * *